United States Patent [19]

Allen

[11] Patent Number: 5,722,304

[45] Date of Patent: Mar. 3, 1998

[54] LINEAR ACTUATOR

[75] Inventor: Terry S. Allen, Phoenix, Ariz.

[73] Assignee: Honeywell Inc., Minneapolis, Minn.

[21] Appl. No.: 204,081

[22] Filed: Mar. 1, 1994

[51] Int. Cl.$^6$ .................................................. F16H 25/20
[52] U.S. Cl. .................. 74/586; 74/89.15; 74/424.8 B; 74/640; 254/102; 254/103; 254/DIG. 2
[58] Field of Search .................. 74/89.15, 424.8 B, 74/586, 640; 254/102, 103, DIG. 2

[56] References Cited

U.S. PATENT DOCUMENTS

| | | | |
|---|---|---|---|
| 1,396,259 | 11/1921 | Coryell | 254/102 |
| 1,532,702 | 4/1925 | Lane | 254/102 |
| 1,565,878 | 12/1925 | White | 254/102 |
| 1,787,342 | 12/1930 | Flowers | 74/424.8 B X |
| 2,674,453 | 4/1954 | Hummert | 268/108 |
| 4,583,421 | 4/1986 | Rose | 74/586 |
| 4,719,816 | 1/1988 | Carlnas | 74/625 |
| 4,818,175 | 4/1989 | Kimura | 414/730 |
| 5,041,748 | 8/1991 | Huber | 320/80 |
| 5,144,851 | 9/1992 | Grimm et al. | 74/424.8 |
| 5,313,852 | 5/1994 | Arena | 74/424.8 B X |

FOREIGN PATENT DOCUMENTS 60-73163  4/1985  Japan .
61-74936  4/1986  Japan .

*Primary Examiner*—Allan D. Herrmann
*Attorney, Agent, or Firm*—Thomas A. Rendos

[57] ABSTRACT

A linear actuator comprising a hollow first cylindrical shaft with helical threads on its exterior surface and helical threads of opposite pitch on its interior surface and a second cylindrical shaft having an exterior surface with helical threads of the same pitch as on the interior surface of the first shaft and a motor for rotating the first shaft and relative to the second shaft end a base member. The second cylindrical shaft is coaxial with and adjacent the first shaft surface and its threads engage the threads of the first interior surface. Helical threads on the base member of the same pitch as the first shaft exterior surface threads are coaxial with and adjacent the first shaft exterior surface and engage the helical threads of the exterior surface of the first cylindrical shaft.

7 Claims, 6 Drawing Sheets

LINEAR ACTUATOR

BACKGROUND

This invention relates to linear actuators.

Position actuators are widely used for remotely controlling displacement of objects, such as valves, doors or any physical object which can be moved or positioned in a predetermined way. Linear actuators move objects in a straight line, but with suitable connectors, displacement can be in any direction or in any plane. Performance of such actuators is especially critical in spacecraft, where length adjustments must be accurate and the actuator must be compact, lightweight, very reliable and, if possible, inexpensive. In space applications, the size and weight of actuators directly affect the payload. Typically, nonhydraulic linear actuators have a single lead screw which is extended or retracted by rotating a nut about the lead screw. Displacement is limited to the length of the lead screw; thus, if a five inch displacement (throw) is desired, an actuator of at least five inches length is required.

SUMMARY

This invention is an actuator that is not limited by the length of the lead screw and is lightweight, compact, reliable and easily adaptable to spacecraft use. The invention is a linear actuator which comprises two actuator elements that move in opposite directions along parallel paths, a directly driven shaft with a rotational axis parallel to the direction of motion of the actuator elements, and a coupling mechanism that couples the drive shaft to the actuator elements so that rotation of the drive shaft causes simultaneous linear motion of both actuator elements in opposite directions. In one aspect, the actuator has a hollow first cylindrical shaft with helical threads of a predetermined pitch on the shaft's exterior surface and helical threads of an opposite pitch on the interior surface. Threads of the second shaft engage the first shaft's interior surface threads. A base member with a cylindrical interior surface with helical threads of the same pitch as the first shaft's exterior surface threads is coaxial with and adjacent to the exterior surface of the first shaft. The exterior surface threads of the first shaft engage the interior surface threads of the base member. The invention also includes means for rotating the first shaft and means for fixing the axial orientation of the rotating means relative to the base member.

Some advantages are:

1. reduced retracted length required for a predetermined throw;
2. minimized space consumption;
3. simple design;
4. minimized moving parts;
5. minimized external movement;
6. a self-contained actuator capable of operation without external stabilization;
7. an actuator capable of operation in multiple orientations; and
8. accurate control of actuator length relative to drive motor revolutions.

Other advantages and features will become apparent from the following description and from the claims.

DETAILED DESCRIPTION OF THE PREFERRED EMBODIMENT

Figure 1:
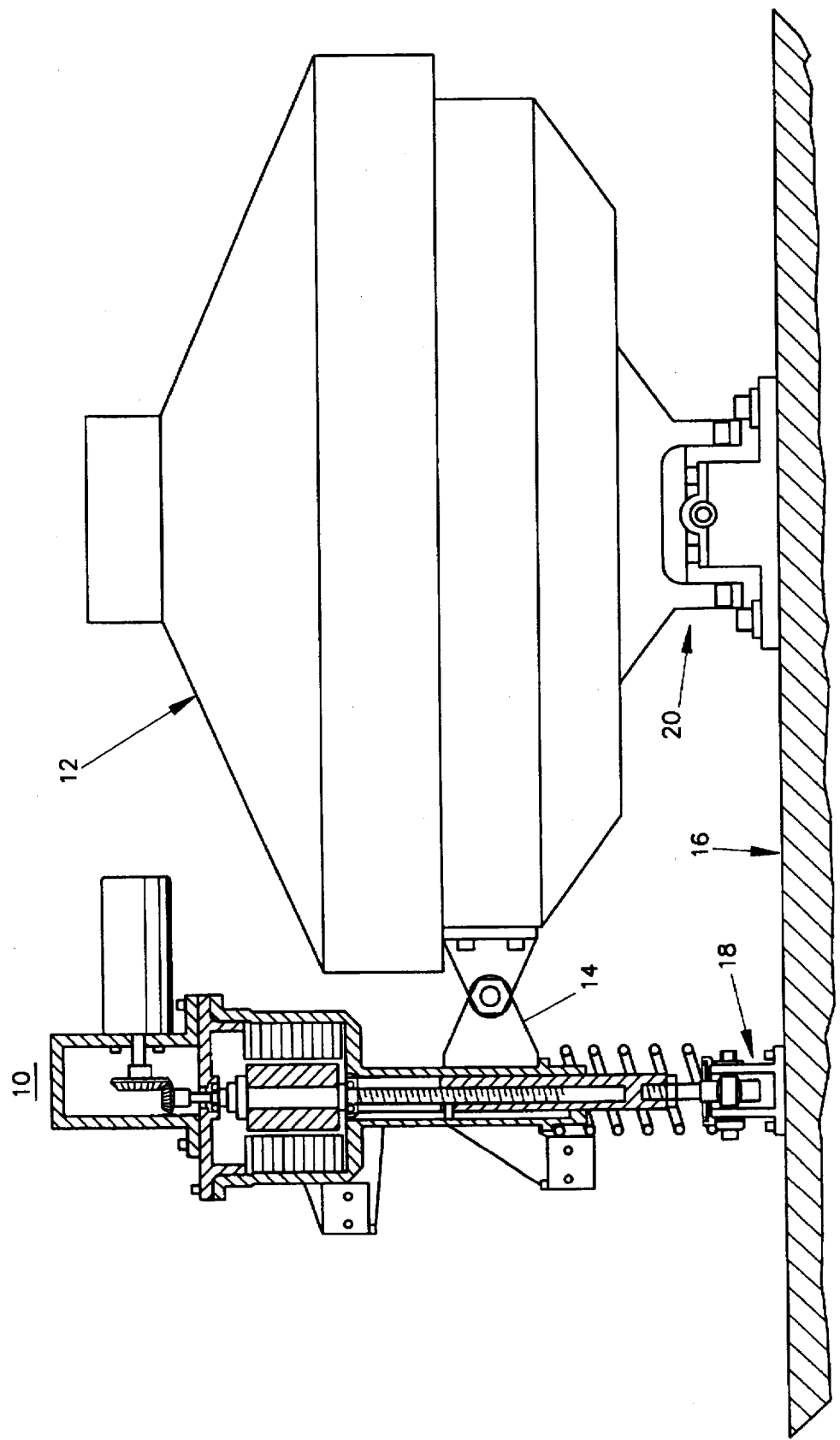
FIGS. 1 and 2 are elevational views of a known actuator attached to a reaction wheel assembly shown in two different positions.
Figure 2:
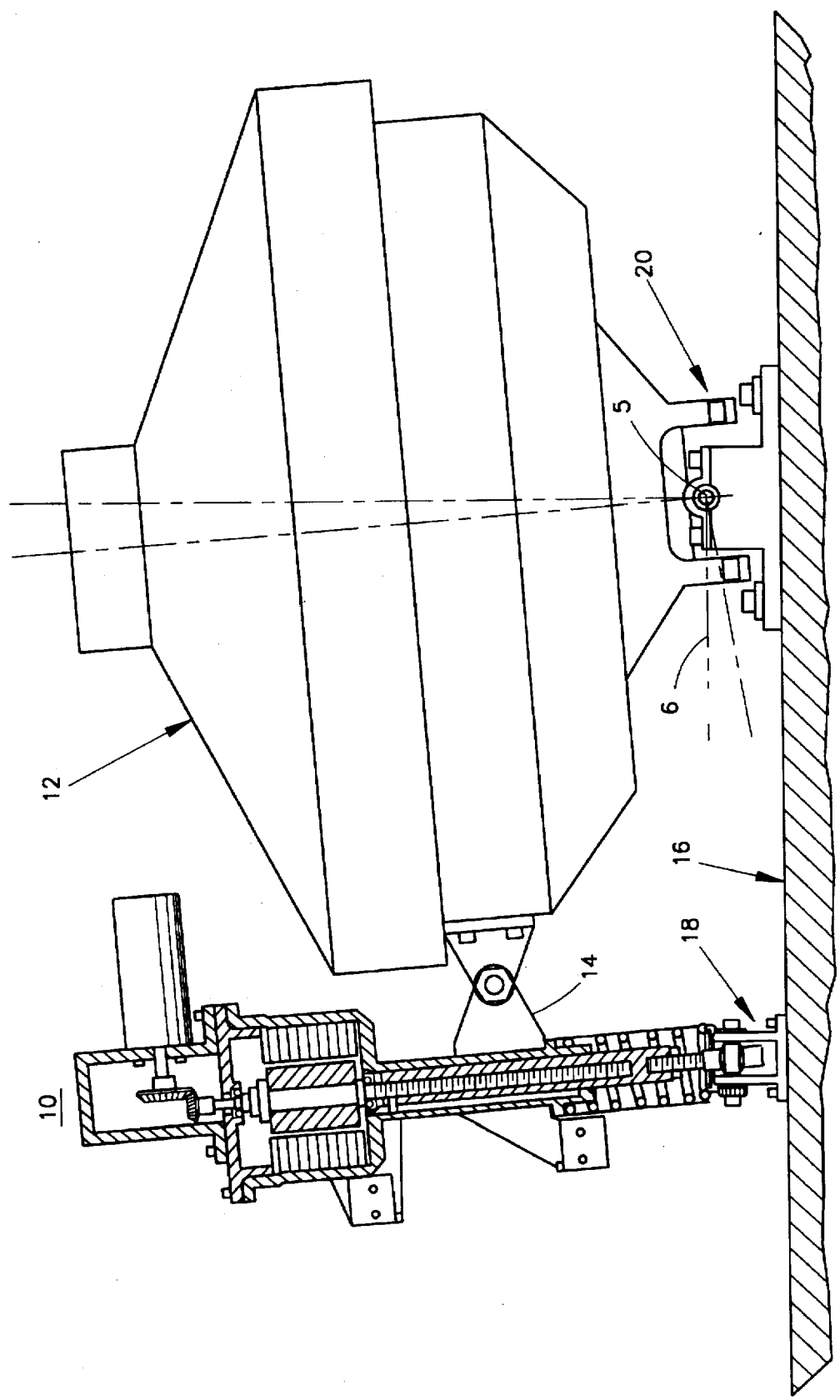

Referring to FIGS. 1 and 2, a linear actuator 10 is connected to a reaction wheel assembly 12 by a clevis 14. The actuator 10 is also connected by a ball joint 18 to a spacecraft 16, which, in turn, is connected to the reaction wheel assembly 12 by a Hooke's joint 20. The reaction wheel assembly 12 houses a gyroscope and, as shown in FIG. 2, upon activation, the actuator 10 moves the spacecraft 16 relative to the reaction wheel assembly 12 about axis 5. A second actuator, not shown in FIGS. 1 and 2, but identical to actuator 10 and mounted between the spacecraft 16 and reaction wheel assembly 12 in a predetermined location coincident to axis 5, upon activation, moves the spacecraft 16 relative to the reaction wheel assembly 12 about axis 6.

Figure 3:
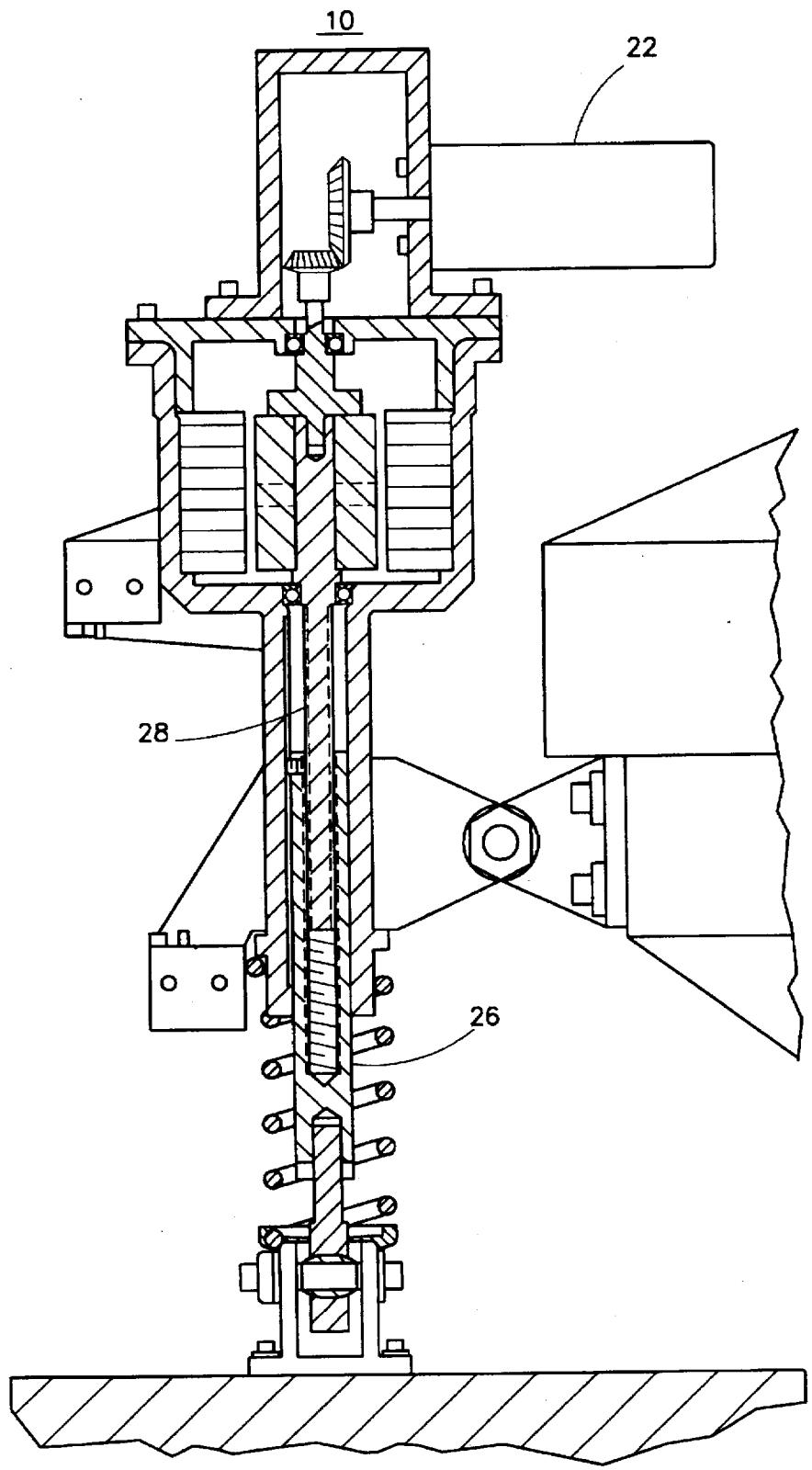
FIGS. 3 is an elevational view in cross section of a known linear actuator.

As can be seen in FIG. 3, a motor 22 turns lead screw 28 which passes through nut 26 in a known linear actuator 10. As lead screw 28 rotates, the nut 26 is extended or retracted, depending upon the direction of rotation of lead screw 28. The throw of this actuator is limited to the length of threads on the lead screw 28.

Figure 4:
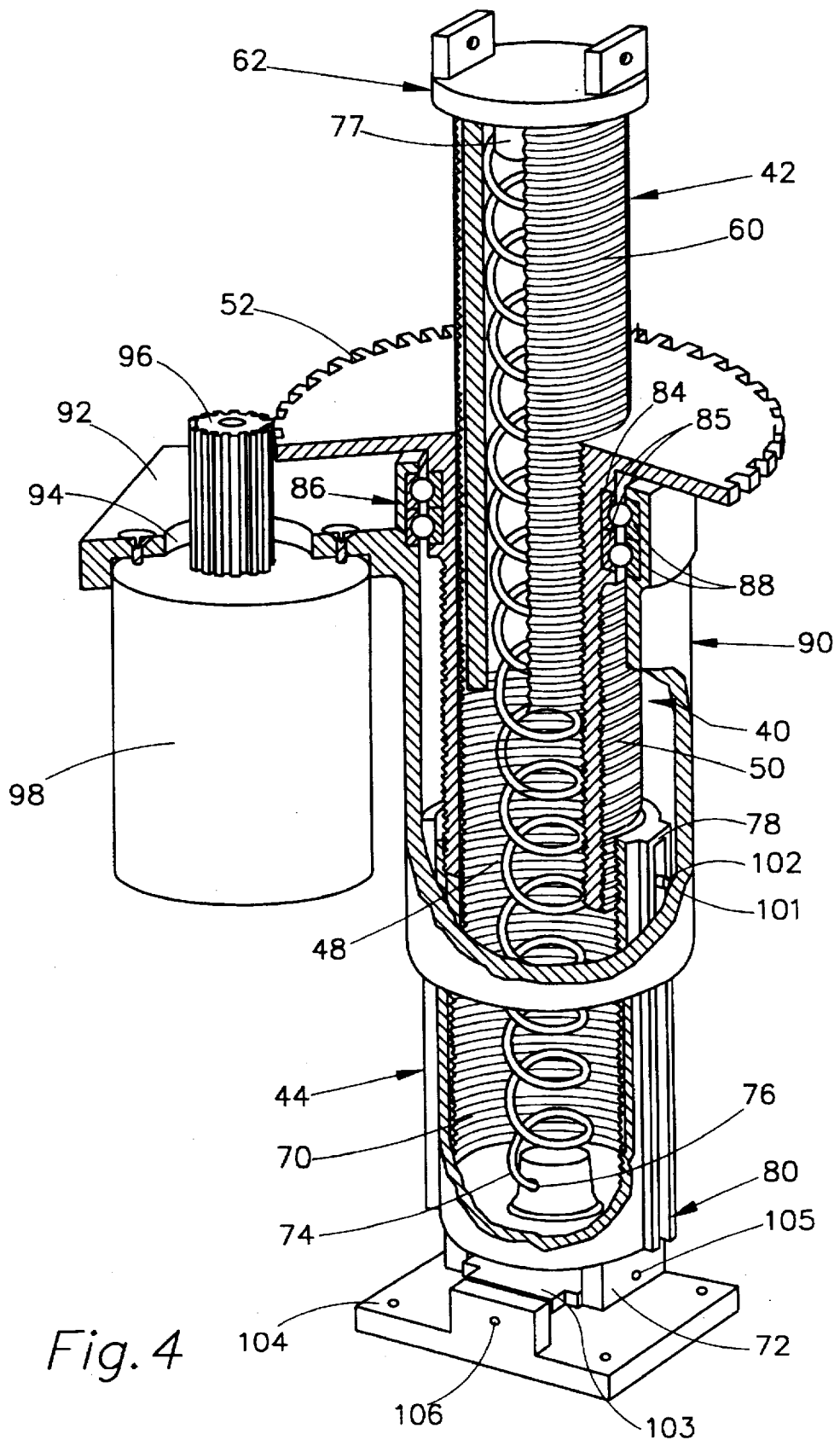
FIGS. 4, 5 and 6 are elevational views in cross section of linear actuators according to the invention.

FIG. 4 shows one embodiment of the invention. A hollow first cylindrical shaft 40 is between a second cylindrical shaft 42 and base member 44. The first cylindrical shaft 40 has left-hand threads 48 on the interior surface and right-hand threads 50 on the exterior surface. At one end of the first shaft is a ting gear 52 which is coaxial with the first cylindrical shaft.

The second cylindrical shaft 42 is coaxial with and adjacent to the interior surface of the first cylindrical shaft 40. The external surface of the second shaft 42 has left-hand threads 60 which engage the left-hand threads 48 of the first cylindrical shaft 40. The second shaft 42 connects to a reaction wheel connecting member 62. When connected to the reaction wheel assembly 12, the reaction wheel connecting member 62 prevents rotation of the second shaft 42 about its longitudinal axis.

The base member 44 is coaxial with the first cylindrical shaft 40 and adjacent the first shaft's 40 exterior surface. The cylindrical base member 44 has a cylindrical interior surface with right-hand threads 70. The spacecraft-connecting member 72 is connected to the base member 44. A spring 74 engages the base member aperture 76 and the second cylinder aperture 77. Remote from the spacecraft-connecting member 72 end of the base member 44 is a stop collar 78. The base member 44 has an ant-rotation groove 80 running from the stop collar 78 to the spacecraft-connecting member end of the base member 44.

The first cylinder 40 has a collar 84 which engages a pair of interior bearing races 85. Adjacent the interior beating races 85 are a pair of external beating races 88 adjacent the actuator housing 90. When a predetermined quantity of balls of a proper diameter, and ball separators are assembled into the annular spaces between interior races 85 and exterior races 88, a duplex beating 86 is created which provides a rigid support, with rotational freedom, between the first cylinder 40 and the housing 90. Protruding from the actuator housing 90 is a motor support flange 92 with an aperture 94. Passing through the motor support flange aperture 94 is a pinion 96, which is attached to a motor 98 and engages the ring gear 52 connected to the first cylindrical shaft 40. At one end of the housing 90 is an anti-rotation aperture 101 perpendicular to the longitudinal axis of the actuator into which an anti-rotation pin 102 is inserted. The pin 102 engages groove 80 in the exterior surface of the base member 44.

In this configuration, clockwise motor drive will rotate the ring gear 52 counterclockwise. The ring gear 52 transfers rotation to the first cylindrical shaft 40 which extends the second shaft 42 and the base member 44 relative to the first cylindrical shaft 40. Conversely, counterclockwise rotation of the motor 98 will retract the second shaft 42 and base member 44. Duplex bearing 86 allow the first cylindrical shaft 40 to rotate freely relative to the housing 90. The anti-rotation pin 102 and anti-rotation groove 80 prevent movement of the housing 90 relative to the base member 44. The housing 90 is connected to the motor 98; therefore, the motor 98 and the base member 44 are prevented from rotating relative to each another. Similarly, the second shaft 42 is prevented from rotating with the first cylindrical shaft 40 by the reaction wheel connecting member 62 connected to the reaction wheel assembly 12. The spring 74 reduces the likelihood of damaging slack within the system. The stop collar 78 prevents the base member 44 from extending beyond the threads of the first cylindrical shaft 40.

The spacecraft connecting member 72 connects to a Hooke's joint element 103, which has a first aperture 105. Bearings provide a rotation axis between the actuator and the spacecraft mounting element 104 parallel to the first aperture 105 axis. Spacecraft mounting element 104 has a second aperture 106. Bearing assemblies connect the Hooke's joint element 103 to the spacecraft mounting element 104 and provide a rotation axis between the actuator and the spacecraft mounting element 104 that is parallel to the axis of the second aperture 106 and perpendicular to the first aperture 105 axis.

The Hooke's joint attachment allows the reaction wheel 12 to be rotated freely about Hooke's joint 20 axes 5 and 6. The Hooke's joint element 103 prevents rotation of the actuator housing 90 and base member 44 about their longitudinal axes, thereby providing an exact relationship between drive motor pinion 96 rotations and extensions or retractions of the second cylindrical shaft 42 and the base member 44.

A ball joint 18 connection of the type shown in FIGS. 1, 2 and 3 permits limited rotation about its longitudinal axis and, if used to connect the actuator to the spacecraft, would permit limited rotation of the second cylindrical shaft 42 relative to the first cylindrical shaft 40. Since the relationship between drive motor revolutions and second cylindrical shaft 42 and base member 40 extensions and retractions becomes inexact, positioning accuracy of the actuator is impaired. The Hooke's joint connection does not permit rotation about the longitudinal axis and thus provides superior positioning accuracy.

Figure 5:
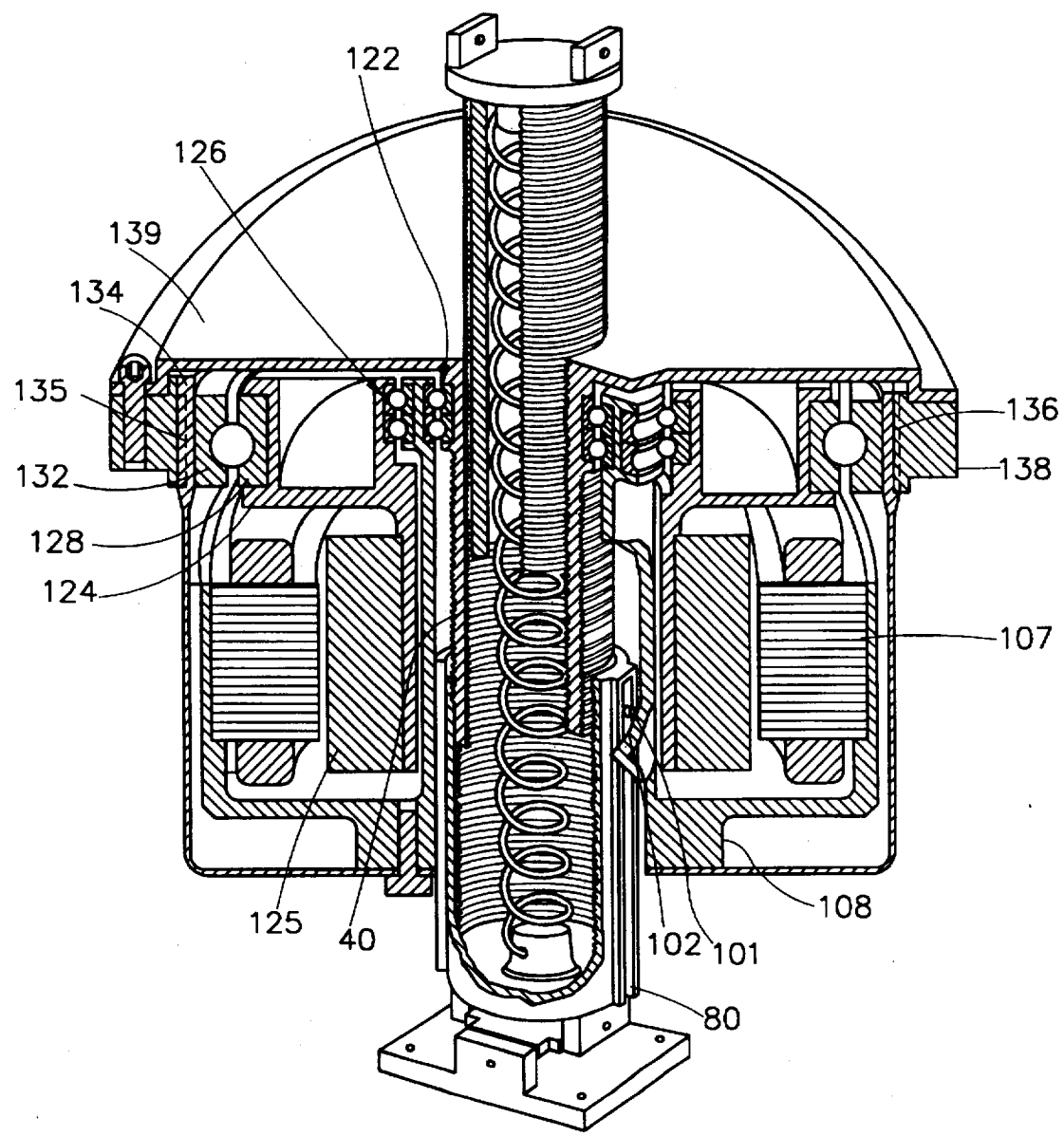

Other embodiments are within the appended claims. For example, FIG. 5 depicts an alternative embodiment in which the first cylindrical shaft 40 is rotated by a harmonic drive. Harmonic drives, such as those sold by Harmonic Drive of Wakefield, MA, have the advantage of providing a high gear ratio, low backlash, high efficiency, long life and mounting simplicity. The drive motor stator 107 is mounted to support 108. Support 108 also contains an aperture 101, into which is inserted the antirotation pin 102. The anti-rotation pin 102 engages antirotation groove 80 in the exterior surface of base member 44. The first cylindrical shaft 40 engages duplex bearing 122. Duplex bearing 122 provides a rigid support with rotational freedom between support 108 and the first cylindrical shaft 40. A similar duplex bearing 126 provides a rigid support with rotational freedom between support 108 and torque transfer sleeve 124. Mounted to torque transfer sleeve 124 is the drive motor rotor 125. When energized by the drive motor stator 107, rotational motion is imparted to the wave generator inner race 128 which causes wave generator outer race 132 to induce flex spline 134 deflections which cause cyclical mating and demating of flex spline external gear teeth 135 with rigid circular spline gear internal teeth 136. Since the flex spline 134 has two fewer teeth than the rigid circular spline 138, a two tooth rotational advancement is imparted to rigid circular spline 138 for each rotation of wave generator inner race 128. The circular spline 138 is also connected to the annular torque transfer member 139. The torque transfer member 139 is connected to one end of the first cylindrical shaft 40.

The first cylindrical shaft 40 has left-hand threads 48 on its interior surface and right-hand threads 50 on its external surface. Adjacent the interior surface of the first cylindrical shaft 40 is a second cylindrical shaft 42 with left-hand threads 60 on its exterior surface. Adjacent the exterior surface of the first cylindrical shaft 40 is a base member 44 with right-hand threads 70 on its interior surface. The base member 44 has a longitudinal anti-rotation groove 80 on its exterior surface. The anti-rotation pin 102 slidingly engages the anti-rotation groove 80, preventing rotation of the harmonic drive motor stator 107 relative to the base member 44.

Figure 6:
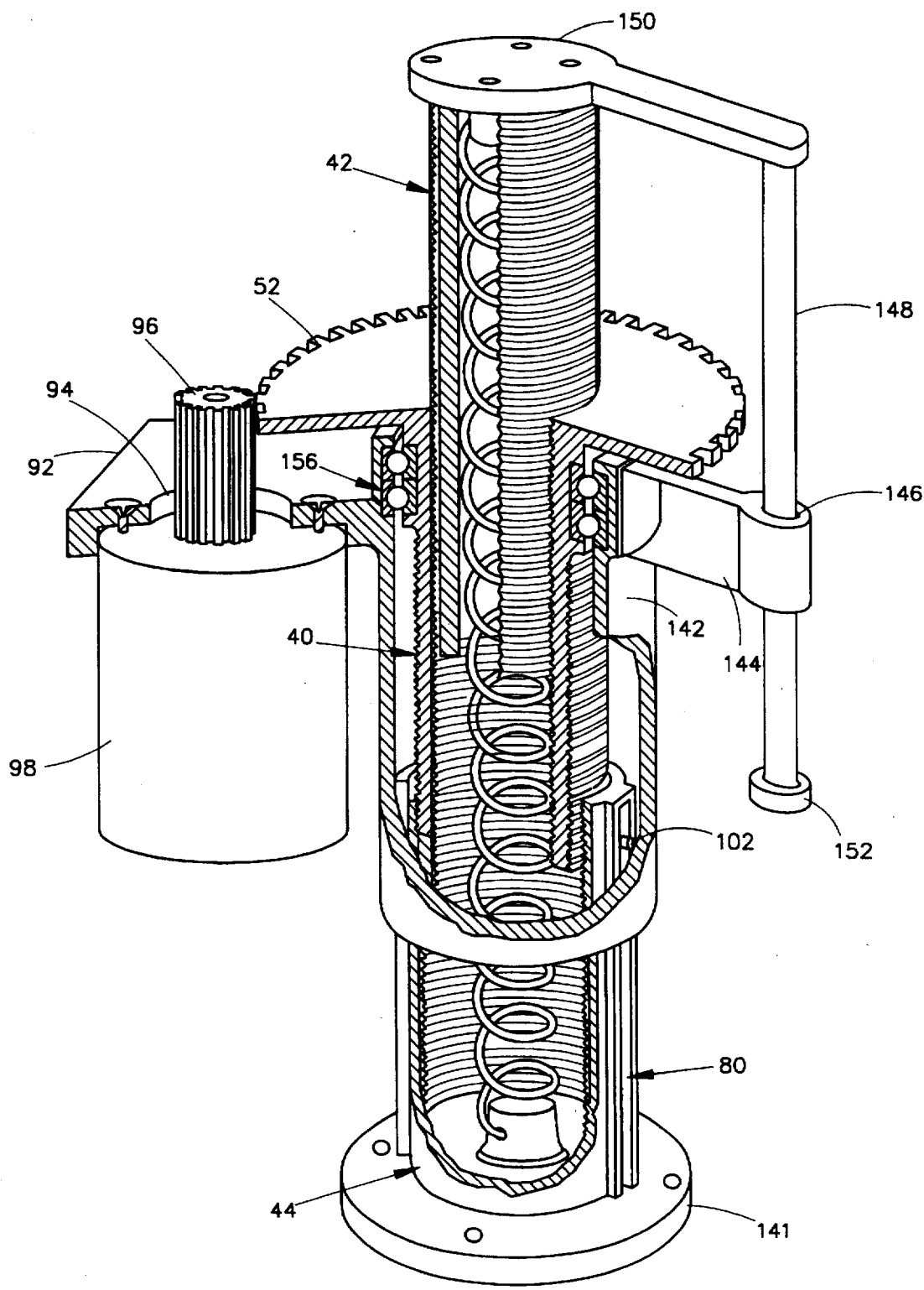

Another alternative is shown in FIG. 6. Shaft 40 has left-hand threads 48 on its interior surface and right-hand threads 50 on its external surface. Adjacent the interior surface is a second cylindrical shaft 42 with left-hand threads 60 on its exterior surface. Adjacent the exterior surface of shaft 40 is a base member 44 with right-hand interior threads 70. The base member has a longitudinal anti-rotation groove 80 on its exterior surface and is connected to a ground support member 141. Pin 102 slidingly engages the anti-rotation groove 80, preventing rotation of lift housing 142 relative to the base member 44.

The lift housing 142 has an anti-rotation flange 144 with a first aperture 146 parallel to the longitudinal axis of the actuator. An anti-rotation rod 148 passes through the first aperture 146. One end of the anti-rotation rod 148 is connected to a lift member 150 which is also connected to the second cylindrical shaft 42. The other end of the anti-rotation rod 148 forms a stop 152 that has a diameter greater than the first aperture 146. The stop 152 prevents overextension of the actuator. The anti-rotation rod 148 prevents rotation of the lift member 150 relative to the lift housing 142. The lift member 150 prevents rotation of the second shaft 42 relative to the base member 44. Thus, during operation, shaft 40 rotates relative to shaft 42 and the base member 44, causing shaft 42 and base member 44 to extend or retract.

The lift housing 142 has a motor support flange 92 which has a second aperture 94 parallel to the longitudinal axis of the actuator. A motor 98 is attached to the flange 92, and a pinion 96 extends through the second aperture 94. The pinion 96 engages a ring gear 52 connected to the first cylindrical shaft 40. A bearing set 156 separates the first cylindrical shaft 40 from the lift housing 142, permitting the first cylindrical shaft 40 to rotate relative to the lift housing 142, the second shaft 42 and base member 44.

The anti-rotation rod 148 and flange 144 could be replaced by splined shafts connecting the interior of the second shaft 42 and the base member 44. A first stabilizing shaft with splines on its exterior surface could be placed adjacent the splined interior of the second shaft 42. The first stabilizing shaft interior surface could also be splined. A second stabilizing shaft with a splined exterior surface could be placed adjacent the interior surface of the first stabilizing shaft. The second stabilizing shaft could then be connected to the end of the base member 44 adjacent the ground support member. Shaft 42 and the first stabilizing shaft are free to move longitudinally relative to one another. The first and second stabilizing shafts are similarly free to move longitudinally relative to one another. However, the interconnecting splines would limit any axial movement. Thus, the actuator could freely extend and retract while preventing the axial rotation of the second shaft 42 and the base member relative to one another.

The anti-rotation pin and groove depicted in any of the above alternative embodiments may be replaced by any noncircular interface between the housing and base member. For example, the base member could have splines and grooves slidingly engaging the housing. The base member and housing could have adjacent grooves, and a rigid ball could be placed in the grooves. The ball could act as a bearing, reducing the friction of the engagement between the housing and the base member while preventing the axial rotation of one relative to the other. Alternatively, the base member could have various noncircular cross sections permitting engagement with the housing to prevent rotation of the base member relative to the housing.

What is claimed is:

1. A linear actuator comprising:
   a rotatable hollow first cylindrical shaft having a rotational axis;
   a second cylindrical shaft, said second cylindrical shaft being coaxial with said first cylindrical shaft and adjacent to an interior surface of the first cylindrical shaft;
   a base member with a cylindrical interior surface coaxial with and adjacent an exterior surface of said first cylindrical shaft;
   a coupling mechanism that couples the first shaft to the second shaft and the base member, such that rotation of the first shaft cause simultaneous linear motion of the second shaft and the base member parallel to the rotational axis and in opposite directions along parallel paths, the coupling mechanism including helical threads of a first pitch on the exterior surface of the first shaft engaging threads of said first pitch on the interior surface of the base member and helical threads of a second opposite pitch on the interior surface of the first shaft engaging threads of said second pitch on an exterior surface of the second shaft;
   means for rotating said second shaft;
   means for fixing the axial orientation of said rotating means relative to said base member; and
   a spring connecting said second shaft and said base member.

2. The structure of claim 1 in which the means for rotating the first cylindrical shaft comprises a ring gear connected to said first cylindrical shaft, a pinion gear engaging said ring gear, and a motor engaging said pinion gear.

3. The structure of claim 1 in which said means for fixing the axial orientation of said rotating means relative to said base member comprise a housing in sliding engagement with said base member.

4. The structure of claim 1 wherein said base member has a longitudinal groove and said housing has a protruding member slidingly engaged with said base member longitudinal groove.

5. The structure of claim 4 wherein the protruding member is a pin.

6. A linear actuator comprising:
   a rotatable hollow first cylindrical shaft having a rotational axis;
   a second cylindrical shaft, said second cylindrical shaft being coaxial with said first cylindrical shaft and adjacent to an interior surface of the first cylindrical shaft;
   a base member with a cylindrical interior surface coaxial with and adjacent an exterior surface of said first cylindrical shaft;
   a coupling mechanism that couples the first shaft to the second shaft and the base member, such that rotation of the first shaft cause simultaneous linear motion of the second shaft and the base member parallel to the rotational axis and in opposite directions along parallel paths, the coupling mechanism including helical threads of a first pitch on the exterior surface of the first shaft engaging threads of said first pitch on the interior surface of the base member and helical threads of a second opposite pitch on the interior surface of the first shaft engaging threads of said second pitch on an exterior surface of the second shaft;
   means for rotating said first shaft including a harmonic drive motor connected to said first shaft; and
   means for fixing the axial orientation of said rotating means relative to said base member.

7. A linear actuator comprising:
   a rotatable hollow first cylindrical shaft having a rotational axis;
   a second cylindrical shaft, said second cylindrical shaft being coaxial with said first cylindrical shaft and adjacent to an interior surface of the first cylindrical shaft;
   a base member with a cylindrical interior surface coaxial with and adjacent an exterior surface of said first cylindrical shaft;
   a coupling mechanism that couples the first shaft to the second shaft and the base member, such that rotation of the first shaft cause simultaneous linear motion of the second shaft and the base member parallel to the rotational axis and in opposite directions along parallel paths, the coupling mechanism including helical threads of a first pitch on the exterior surface of the first shaft engaging threads of said first pitch on the interior surface of the base member and helical threads of a second opposite pitch on the interior surface of the first shaft engaging threads of said second pitch on an exterior surface of the second shaft;
   means for rotating said first shaft;
   means for fixing the axial orientation of said rotating means relative to said base member; and
   an anti-rotation rod connected to said second cylindrical shaft, a housing connected to the rotating means, and said housing having an aperture parallel to the axis of said first cylindrical shaft through which said anti-rotation rod passes.

* * * * *